(12) United States Patent
Gownder et al.

(10) Patent No.: US 8,127,272 B2
(45) Date of Patent: *Feb. 28, 2012

(54) AUTOMATED SOURCE CODE GENERATION

(75) Inventors: Srilekha Krishnan Gownder, Austin, TX (US); Kumar Marappan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

This patent is subject to a terminal disclaimer.

(21) Appl. No.: 12/034,960

(22) Filed: Feb. 21, 2008

(65) Prior Publication Data

US 2008/0148229 A1    Jun. 19, 2008

Related U.S. Application Data

(63) Continuation of application No. 10/165,081, filed on Jun. 6, 2002, now Pat. No. 7,392,504.

(51) Int. Cl.
*G06F 9/44*    (2006.01)

(52) U.S. Cl. .......... 717/106; 717/108; 717/110
(58) Field of Classification Search .......... 717/106–110
See application file for complete search history.

(56) References Cited

U.S. PATENT DOCUMENTS

| | | | |
|---|---|---|---|
| 6,298,389 B1 | 10/2001 | Gerhardt | 709/313 |
| 6,304,886 B1 | 10/2001 | Bernardo et al. | 707/530 |
| 6,317,760 B1 | 11/2001 | Byrd et al. | 707/513 |
| 6,339,839 B1 | 1/2002 | Wang | 717/5 |
| 2001/0037490 A1 | 11/2001 | Chiang | 717/2 |

*Primary Examiner* — Anna Deng
(74) *Attorney, Agent, or Firm* — VanLeeuwen & VanLeeuwen; Mark Vallone

(57) ABSTRACT

Automated source code generation is presented. Processing uses a parser call back function to identify relevant HTML tags in an HTML file. Processing extracts HTML tag information from the relevant HTML tags and stores the HTML tag information in a variable table. A user may configure the variable table to instruct processing to generate getter source code and/or setter source code on a tag-by-tag basis. Processing retrieves a source code template and generates java bean source code by combining the source code template with the information in the variable table.

11 Claims, 6 Drawing Sheets

AUTOMATED SOURCE CODE GENERATION

RELATED APPLICATIONS

This application is a continuation application of U.S. Non-Provisional patent application Ser. No. 10/165,081, entitled "System and Method for Automated Source Code Generation," filed on Jun. 6, 2002 now U.S. Pat. No. 7,392,504.

BACKGROUND OF THE INVENTION

1. Technical Field

The present invention relates in general to a system and method for automatically generating source code. More particularly, the present invention relates to a system and method for generating Java beans that interface with a presentation layer.

2. Description of the Related Art

Software programming languages have evolved from a machine language intensive basis to a user-friendly object oriented basis. The Java programming language is one of the user-friendly programming languages. Java is an object-oriented language that is simplified to minimize language features that cause common programming errors. Java source code files (files with a .java extension) are compiled into a format called bytecode (files with a .class extension), which can then be executed by a Java interpreter. Compiled Java code may run on most computers because Java interpreters and runtime environments, known as Java Virtual Machines (VMs), exist for most operating systems, including UNIX, the Macintosh OS, and Windows. Bytecode may also be converted directly into machine language instructions by a just-in-time compiler (JIT).

A key element of the Java language which makes it user-friendly is Java beans. Java beans are reusable software components that allow a program developer to manipulate and customize the Java beans without having to recompile and change the software. A java bean includes methods which are accessible to other java beans, such as a get method and a set method. The get method is used to retrieve information from other objects and the set method is used to send information to other objects.

Web-based software projects typically have two development efforts, which are a presentation layer effort and a business logic layer effort. A web page designer typically develops the presentation layer (i.e. the web page screen). A computer programmer typically develops the business logic (i.e. the program and database). A challenge found with existing art is that the computer programmer spends time writing Java beans to interface with the presentation layer.

It is more cost effective for the software project if the computer programmer spends his time on developing the business logic instead of writing interfaces to the presentation layer. What is needed, therefore, is a way to automatically generate Java beans to interface with the presentation layer.

SUMMARY

It has been discovered that a bean generator may be used to automate source code generation for Java beans by providing an HTML file and a source code template to the bean generator. The bean generator assigns a variable name to each relevant HTML tag and stores the variable name and other information in a table. The table information, along with the source code template, is used to generate Java bean source code.

The HTML file is input to a parser which searches for HTML tags within the HTML file. When the parser detects an HTML tag, the parser invokes a parser callback command to analyze the detected HTML tag. The parser callback command is configured to analyze HTML tags and store relevant tags corresponding to Java bean getter and setter source code generation. For example, the parser callback command may be configured to store relevant HTML tags such as "hidden", "input", "textarea", "select", "checkbox", and "radio". If the parser sends a relevant tag to the parser callback command, the parser callback command stores information corresponding to the relevant tag (i.e. name and size) in a hash table. On the other hand, if the parser sends an HTML tag to the parser callback command that is not relevant, the parser callback command ignores the tag. The parser continues to search the HTML file for HTML tags until each HTML tag is detected.

Once the parser callback command stores information corresponding to each relevant tag, processing invokes a jtable command. The jtable command is a Java class that creates a table (i.e. rows and columns) using tag information stored in the hash table. The jtable command retrieves relevant tag information from the hash table and creates a variable table. The variable table includes a row corresponding to each relevant tag and various columns which are auditable by a user. For example, the variable table may include a column named "Generated Getters" in which the user may select which tags processing should generate getter source code.

When the user is satisfied with the information included in variable table, the user instructs processing to generate source code. Processing retrieves the variable table information and the source code template. The source code template may be a text file which includes skeleton Java code and placeholders for a class name, variable declarations, getter source code, and setter source code. Processing generates a class name, variable declarations, getter source code, and setter source code for each user-selected variable. The user may save the source code for later compilation.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
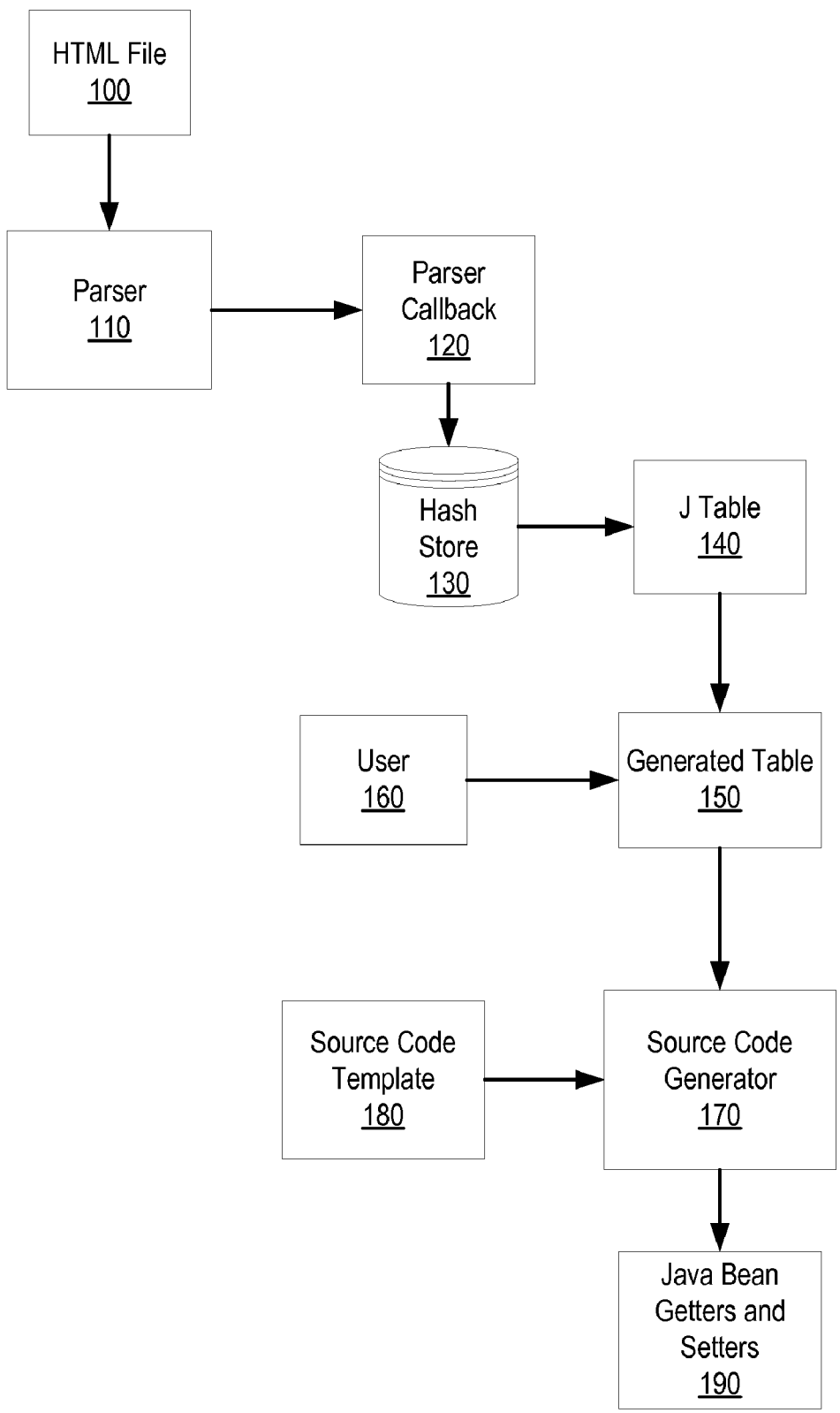
FIG. 1 is a diagram showing processing generating Java bean getter and setter source code using an HTML (Hyper Text Mark-up Language) file.

FIG. 1 is a diagram showing processing generating Java bean getter and setter source code using an HTML (Hyper Text Mark-up Language) file. HTML file 100 is a file that includes HTML code for a particular screen display. For example, HTML file 100 may include code that generates a registration screen. Parser 110 receives HTML file 100 and searches for HTML tags within HTML file 100. When parser 110 detects an HTML tag, parser 110 invokes parser callback 120 to analyze the detected HTML tag. Using the example described above, parser 110 may detect a "textarea" HTML tag and invoke parser callback 120.

Parser callback 120 is configured to analyze HTML tags and store relevant tags corresponding to Java bean getters and setters source code generation. For example, parser callback 120 may be configured to store relevant HTML tags such as "hidden", "input", "textarea", "select", "checkbox", and "radio". If parser 110 sends a relevant tag to parser callback 120, parser callback 120 stores information corresponding to the relevant tag (i.e. name and size) in hash store 130. Hash store 130 may be stored on a non-volatile storage area, such as a computer hard drive. On the other hand, if parser 110 sends an HTML tag to parser callback 120 that is not relevant, parser callback 120 ignores the tag. Parser 110 continues to search HTML file 100 for HTML tags until each HTML tag is detected.

Once parser callback 120 stores information in hash store 130 corresponding to each relevant tag, processing invokes jtable 140. Jtable 140 is a Java class that creates a table (i.e. rows and columns) using tag information stored in hash store 130. Jtable 140 retrieves relevant tag information from hash store 130 and creates generated table 150. Generated table 150 includes a row corresponding to each relevant tag and various columns which are auditable by user 160. For example, generated table 160 may include a column named "Generated Getters" and user 160 may select which tags processing should generate getter source code (see FIG. 2B and corresponding text for further details regarding table properties).

User 160 edits information in generated table 150 if appropriate. When user 160 is satisfied with the information included in generated table 150, user 160 instructs processing to generate source code. Source code generation 170 receives generated table 150 and source code template 180. Source code template 180 may be a text file which includes skeleton Java code and placeholders for a class name, variable declarations, and getter and setter code (see FIG. 3 and corresponding text for further details regarding source code templates).

Source code generator 170 generates Java bean getters and setters 190 using source code template 180 and generated table 150. Java bean getters and setters 190 includes a class name, variable declarations, getter source code, and setter source code. User 160 may save Java bean getters and setters 190 for later compilation.

Figures 2A, 2B, 2C:
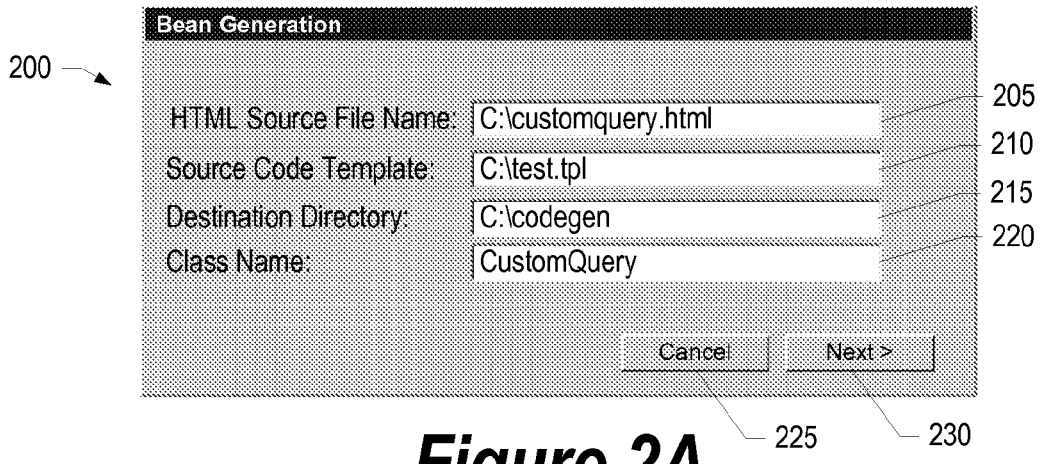
FIG. 2A is a user interface window showing various input selections.
FIG. 2B is a user interface window showing variable table information.
FIG. 2C is a user interface window showing generated source code.

FIG. 2A is a user interface window showing various input selections. File input window 200 includes text boxes for a user to enter information. The user enters information in text box 205 corresponding to a location of an HTML source file in which processing will identify HTML tags. The user enters information in text box 210 corresponding to the location of a source code template that is used for source code generation (see FIG. 3 and corresponding text for further details regarding the use of a source code template).

The user enters information in text box 215 corresponding to the location of the destination directory of the source code that is generated. The user enters information in text box 220 corresponding to the class name that will be used for the generated source code. When the user is finished entering information in the various text boxes, the user selects "Next" box 230 which informs processing to generate a variable table (see FIG. 2B and corresponding text for further details regarding variable table properties). If the user chooses to exit source code generation steps, the user selects "Cancel" button 225.

FIG. 2B is a user interface window showing variable table information. Variable table window 235 shows a row for each relevant HTML tag identified in an HTML source file. Variable table window 235 also includes columns of which some may be editable by a user. Field name column 240 is the name of an HTML input field and includes a value specified for the "name" property of the identified HTML tag (see FIG. 4 and corresponding text for further details regarding tag identification). Variable name column 245 includes a variable name for the field name. In one embodiment, processing may convert the field name to lower case and use the lower case field name as the variable name.

Access modified column 250 includes the access type corresponding to each variable. In one embodiment, the access type default value for each variable may be "private" and is editable by a user. Arrayable column 255 includes a checkbox for each variable. The checkbox is automatically selected if processing determines that the corresponding variable is arrayable (see FIG. 4 and corresponding text for further information regarding variable array determination). In one embodiment, each checkbox corresponding to each variable may be selected or de-selected by the user using variable table window 235.

Data type column 260 includes a data type to be used for source code generation corresponding to each variable. In one embodiment, the data type default may be "string" for each variable and the user may change the data type for each variable using variable table window 235. Generate setters column 265 includes a checkbox for each variable which allows the user to instruct processing to generate or not to generate setter source code for a particular variable. For example, variable "txtitem" has its corresponding "generate setters" checkbox selected which informs processing to generate setter source code for variable "txtitem".

Generate getters column 270 includes a checkbox for each variable which allows the user to instruct processing to generate or not to generate getter source code for a particular variable. Using the example described above, variable "txtitem" has its corresponding "generate getters" checkbox selected which informs processing to generate getter source code for variable "txtitem".

Once the user is finished editing variable table window 235, the user selects "Next" button 280 in which processing generates source code and displays the source code in a source code window (see FIG. 2C and corresponding text for further details regarding source code window). The user may exit variable table window 235 by selecting "Cancel" button 275 and abort source code generation steps.

FIG. 2C is a user interface window showing generated source code. Source code window 285 displays generated source code in text box 290 based upon user selection in variable table window 235 and a source code template (see FIG. 3 and corresponding text for further details regarding source code generation). In the example shown in FIG. 2C, text box 290 includes variable declarations for "txtitem", "enddate", and "usertype" along with a portion of getter source code for variable "txtitem".

The user may review the generated source code and, if acceptable, the user selects "Next" button 299 to store the source code in a non-volatile storage area, such as a computer hard drive. If the user does not wish to store the generated source code shown in text box 290, the user selects "Cancel" button 295 which informs processing to delete the generated source code.

Figure 3:
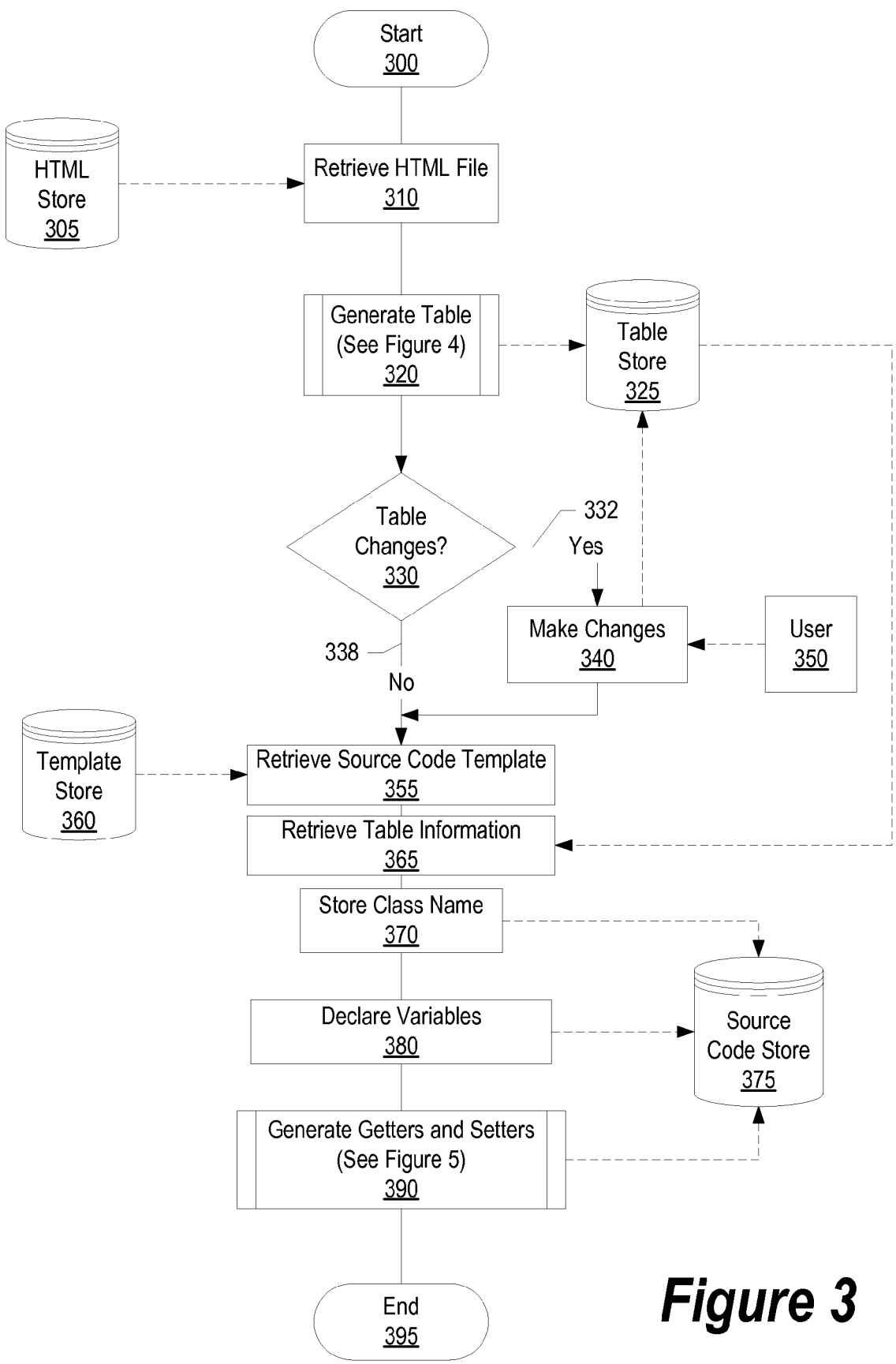
FIG. 3 is a high-level flowchart showing steps taken in generating source code using an HTML file.

FIG. 3 is a high-level flowchart showing steps taken in generating source code using an HTML file. Processing commences at 300, whereupon an HTML file is retrieved from HTML store 305 (step 310). For example, the HTML file may correspond to a screen that requests personal information from a user, such as a registration screen. HTML store 305 may be stored on a non-volatile storage area, such as a computer hard drive.

Figure 4:
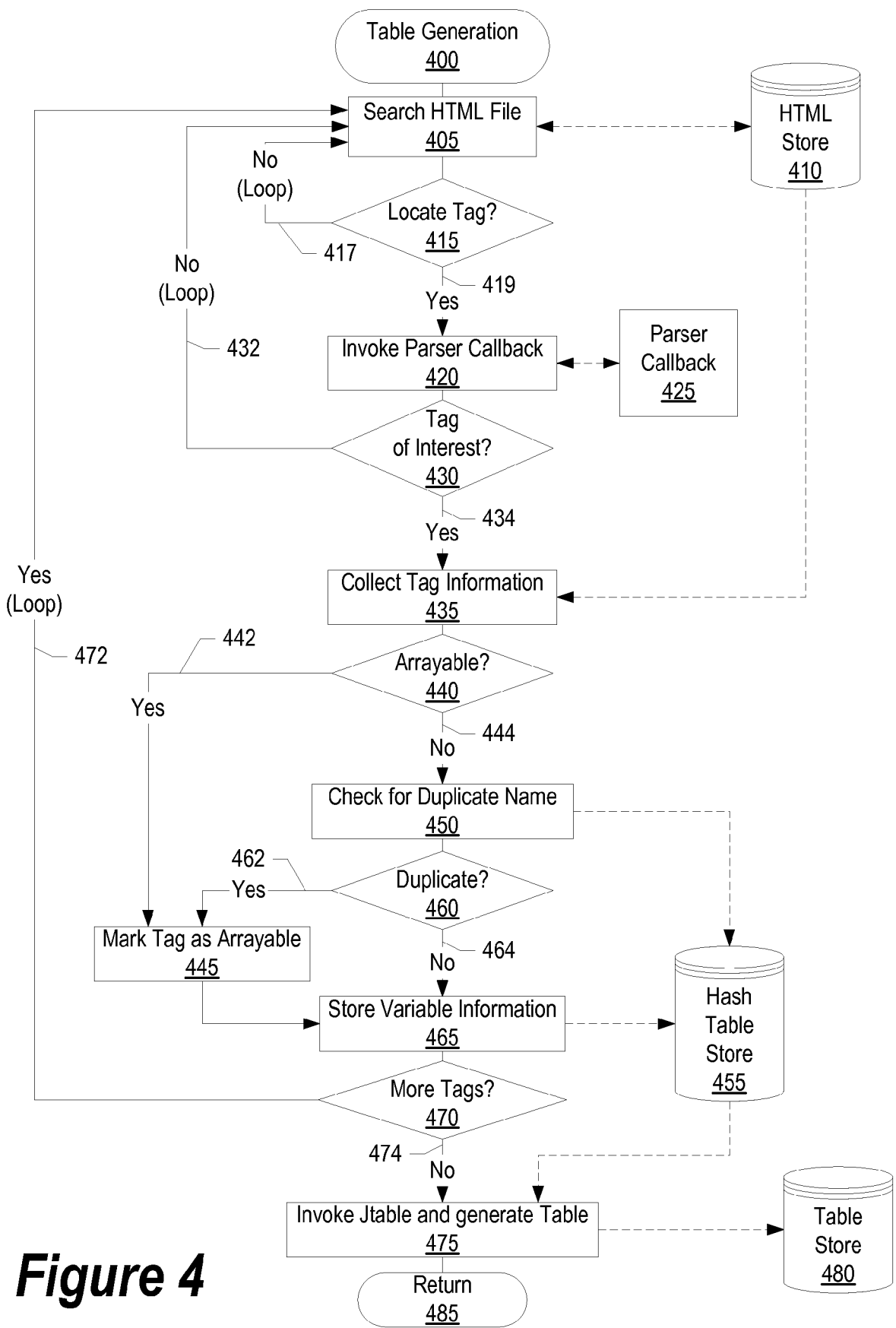
FIG. 4 is a flowchart showing steps taken in generating a variable table.

Processing identifies HTML tags in the HTML file and creates a variable table (pre-defined process block 320, see FIG. 4 and corresponding text for further details). The variable table is stored in table store 325. Table store 325 may be stored on a non-volatile storage area, such as a computer hard drive. Using the example described above, processing may identify HTML tags with corresponding names of "name" and "address". The variable table includes checkboxes for each variable and allows a user to select whether to generate getter source code and/or setter source code for each HTML tag (see FIG. 2B and corresponding text for further details regarding user selection). A determination is made as to whether the user wishes to make changes to the variable table (decision 330). For example, the user may wish to generate getter source code but not generate setter code for each variable. In this example, the user selects the getter checkbox for each variable and de-selects the setter checkbox for each variable.

If the user wishes to make changes to the variable table, decision 330 branches to "Yes" branch 332 whereupon user 350 makes changes to the variable table located in table store 325 (step 340). On the other hand, if the user does not wish to make changes to the variable table, decision 330 branches to "No" branch 338. A source code template is retrieved from template store 360 at step 355. Template store 360 may be stored on a non-volatile storage area, such as a computer hard drive. The source code template may be a text file which includes skeleton Java code which includes placeholders for a class name, variable declarations, getter source code, and setter source code. For example, a source code template may be written as follows:

```
Package mypackage
class <<classname>> {
    <<variabledeclarations>>
    <<gettersandsetters>>
    public void updateTicketInfo( ) {
        ////code to update ticket information
    }
}
``` where "<<classname>>" is a tag used as a placeholder of the name of the class to be generated. The class name may be entered by the user in a user interface window (see FIG. 2A and corresponding text for further details regarding user entry). The placeholder "<<variabledeclarations>>" is a tag used for instance variables that will be generated. These variables correspond to relevant HTML tags that are stored during variable table generation. The placeholder "<<gettersandsetters>>" is a tag used for getter source code and setter source code that will be generated for each selected variable.

Variable table information is retrieved from table store 325 at step 365. Variable table information may include variable names and a class name. The class name is stored in source code store 375 at step 370. Variables are declared corresponding to the variables in the variable table and stored in source code store 375 at step 380. Variables are declared by using variable information located in table store 325 and generating declaration source code based upon the source code template. Using the example described above, the declarations for the "name" variable may be "private string name". Getter source code and setter source code is generated using the variable table information and the source code template (pre-defined process block 390, see FIG. 5 and corresponding text for further details). Processing ends at 395.

FIG. 4 is a flowchart showing steps taken in generating a variable table. Table generation processing commences at 400, whereupon processing searches an HTML file located in HTML store 410 for one or more HTML tags (step 405). HTML store 410 may be stored on a non-volatile storage area, such as a computer hard drive. A determination is made as to whether processing locates an HTML tag (decision 415). If processing does not locate an HTML tag, decision 415 branches to "No" branch 417 which loops back to continue searching for an HTML tag. This looping continues until processing locates an HTML tag, at which point decision 415 branches to "Yes" branch 419 whereupon parser callback 425 is invoked at step 420.

Parser callback 425 is used to analyze the detected HTML tag to determine whether the tag should be included in a variable table. For example, parser callback may be configured to select tags of interest such as "hidden", "input", "textarea", "select", "checkbox", and "radio". A determination is made as to whether the detected tag should be included in the variable table (decision 430). If the tag should not be included in the variable table, decision 430 branches to "No" branch 432 which loops back to continue searching for HTML tags. This looping continues until parser callback 425 locates a tag of interest, at which point decision 430 branches to "Yes" branch 434. Processing collects information from HTML store 410 corresponding to the relevant tag at step 435. Using the example described above, processing may collect size and name information corresponding to a "select" tag. A determination is made as to whether the HTML tag is an arrayable tag (decision 440). For example, if a relevant HTML tag includes more than one choice as an input, such as "checkbox" and "select", the tag is marked as "arrayable". If the relevant tag is an arrayable tag, decision 440 branches to "Yes" branch 442 whereupon the relevant tag is marked as "arrayable". On the other hand, if the relevant tag is not an arrayable tag, decision 440 branches to "No" branch 444.

Processing checks a hash table located in hash table store 455 for a duplicate tag name already stored in the hash table. Hash table store 455 may be stored on a non-volatile storage area, such as a computer hard drive. A determination is made as to whether processing locates a duplicate tag name in the hash table (decision 460). If processing locates a duplicate tag name in the hash table corresponding to the relevant tag, decision 460 branches to "Yes" branch 462 whereupon the relevant tag is marked as "arrayable" (step 445). The relevant tag is marked as "arrayable" since more than one input is possible for the corresponding tag name.

On the other hand, if processing does not locate a duplicate tag name corresponding to the relevant tag, decision 460 branches to "No" branch 464 whereupon variable information is stored in hash table store 455 (step 465). Variable information may include the tag name, and whether the tag is arrayable. A determination is made as to whether there are more tags to locate in the HTML file (decision 470). If there are more tags to locate, decision 470 branches to "Yes" branch 472 which loops back to search for more HTML tags. If there are not more tags to locate, or if processing is finished searching the HTML file, decision 470 branches to "No" branch 474.

A Java-based jtable command is invoked at step 475. The jtable command retrieves each HTML tag information located in hash table store 455 and generates a variable table and stores the variable table in table store 480 (see FIG. 2B and corresponding text for further information regarding variable table properties). Table store 480 may be stored on a non-volatile storage area, such as a computer hard drive. Processing returns at 485.

Figure 5:
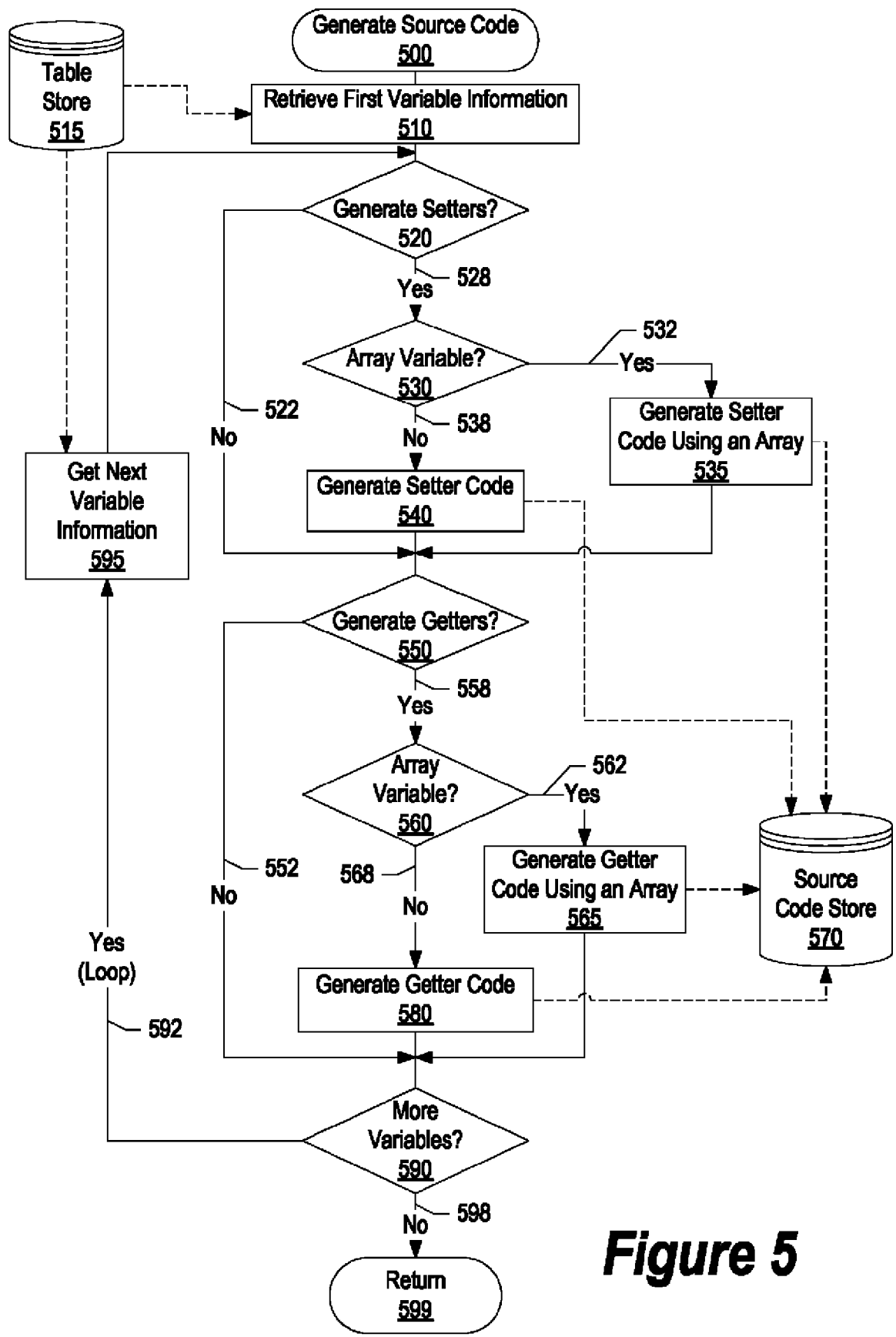
FIG. 5 is a flowchart showing steps taken in generating source code using variable table information.

FIG. 5 is a flowchart showing steps taken in generating source code using variable table information. Source code generation commences at 500, whereupon a first variable is retrieved from table store 515. The variable corresponds a relevant HTML tag previously stored in table store 515 (see FIG. 4 and corresponding text for further details regarding HTML tag analysis). A determination is made as to whether processing should generate setter source code for the variable (decision 520, see FIG. 2B and corresponding text for further details regarding user selection source code generation). If the user did not choose to have processing generate setter source code corresponding to the variable, decision 520 branches to "No" branch 522 bypassing setter source code generation.

On the other hand, if the user chose to have processing generate setter source code corresponding to the variable, decision 520 branches to "Yes" branch 528 whereupon a determination is made as to whether the variable is an arrayable variable (decision 530, see FIG. 4 and corresponding text for further information regarding arrayable variables). If the variable is arrayable, decision 530 branches to "Yes" branch 532 whereupon processing generates setter source code using an array based upon a source code template previously retrieved (step 535, see FIG. 3 and corresponding text for further details regarding source code template properties). On the other hand, if the variable is not arrayable, decision 530 branches to "No" branch 538 whereupon processing generates setter source code for the corresponding variable (step 540).

A determination is made as to whether processing should generate getter source code for the variable (decision 550, see FIG. 2B and corresponding text for further details regarding user selection source code generation). If the user did not choose to have processing generate getter source code corresponding to the variable, decision 550 branches to "No" branch 552 bypassing getter source code generation.

On the other hand, if the user chose to have processing generate getter source code corresponding to the variable, decision 550 branches to "Yes" branch 558 whereupon a determination is made as to whether the variable is an arrayable variable (decision 560, see FIG. 4 and corresponding text for further information regarding arrayable variables). If the variable is arrayable, decision 560 branches to "Yes" branch 562 whereupon processing generates getter source code using an array based upon a source code template previously retrieved (step 565, see FIG. 3 and corresponding text for further details regarding source code template properties). On the other hand, if the variable is not arrayable, decision 560 branches to "No" branch 568 whereupon processing generates getter source code for the corresponding variable (step 580).

A determination is made as to whether the variable table includes more variables to process (decision 590). If the variable table includes more variables to process, decision 590 branches to "Yes" branch 592 which loops back to retrieve (step 595) and process the next variable. On the other hand, if the variable table does not have more variables to process, decision 590 branches to "No" branch 598. Processing returns at 599.

Figure 6:
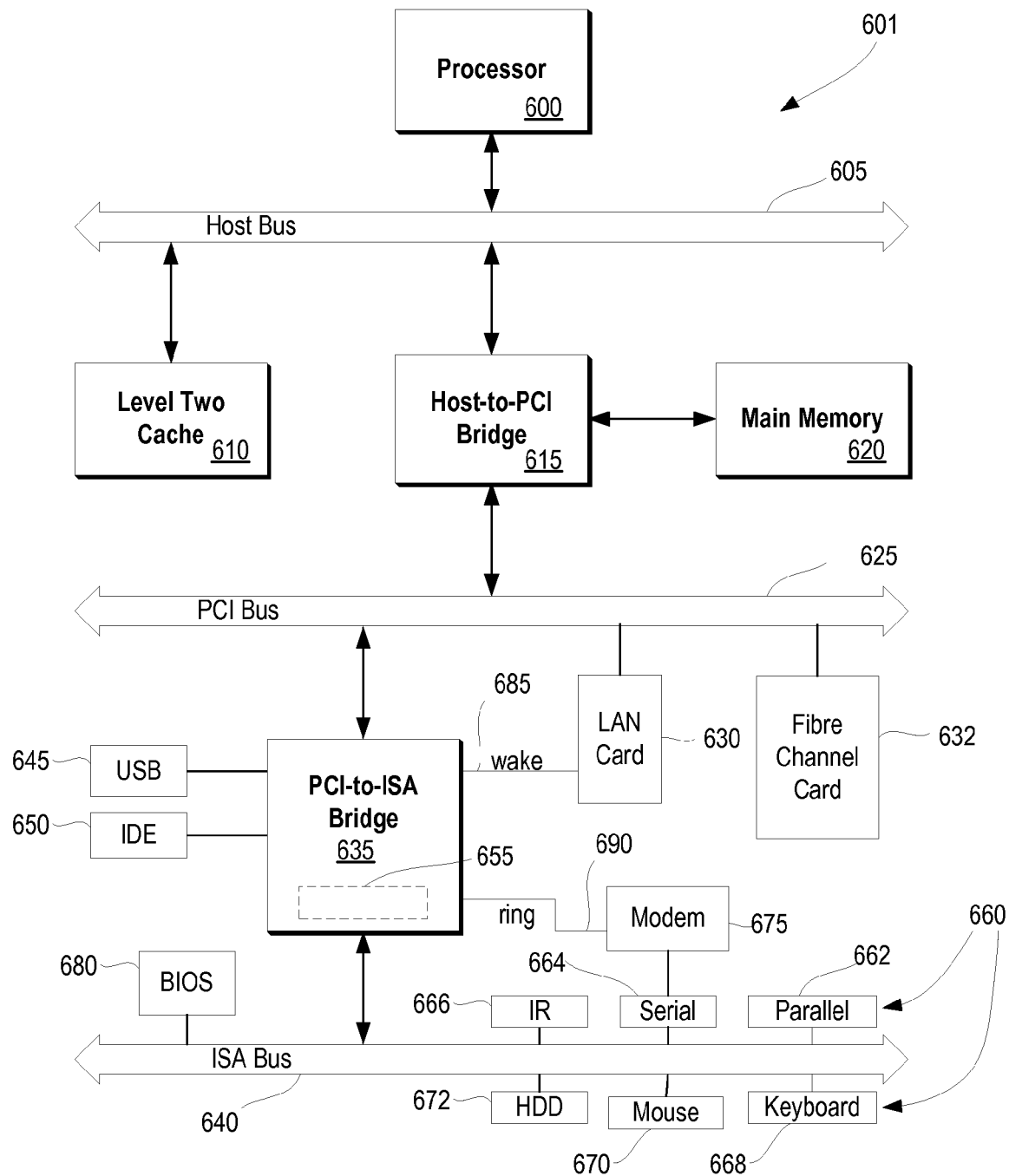
FIG. 6 is a block diagram of an information handling system capable of implementing the present invention.

FIG. 6 illustrates information handling system 601 which is a simplified example of a computer system capable of performing the invention described herein. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (HDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable storage medium, including magnetic storage media, optical storage media, flash memory, random access memory, read only memory, or communications media conveying signals encoding the instructions (e.g., signals from a network). In order to attach computer system 601 to another computer system to copy files over a network, LAN card 630 is coupled to PCI bus 625 and to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory accessible by the processors;
   one or more nonvolatile storage devices accessible by the processors;
      program instructions, stored on at least one of the one or more storage devices for execution by at least one of the one or more processors via the memory, for receiving a tag-based input file;
      program instructions, stored on at least one of the one or more storage devices for execution by at least one of the one or more processors via the memory, for identifying one or more tags in the input file that include a field name;
      program instructions, stored on at least one of the one or more storage devices for execution by at least one of the one or more processors via the memory, for creating a variable name for one or more of the field names in the identified tags;
      program instructions, stored on at least one of the one or more storage devices for execution by at least one of the one or more processors via the memory, for generating source code for one or more of the identified tags, the source code including the created variable name;
      wherein the source code is selected from the group consisting of setter source code and getter source code, the setter source code and the getter source code being Java bean source code; and
      wherein the program instructions for generating further comprise:
         program instructions for selecting a source code template; and
         program instructions for combining the source code template with the variable name.

2. The information handling system as described in claim 1 wherein the field name is the same as the variable name.

3. The information handling system as described in claim 1 further comprising:
   program instructions, stored on at least one of the one or more storage devices for execution by at least one of the one or more processors via the memory, for displaying a screen wherein the displaying includes one or more of the created variable names;
   program instructions, stored on at least one of the one or more storage devices for execution by at least one of the one or more processors via the memory, for receiving a user selection, the selection corresponding to generating the getter source code and the setter source code for one of the created variable names; and
   wherein the program instruction to generate the source code generate the source code for each of the user selected items.

4. The information handling system as described in claim 1 wherein the source code includes a class name and one or more variable declarations, the variable declarations corresponding to one or more of the tags.

5. The information handling system as described in claim 1 further comprising:
   program instructions, stored on at least one of the one or more storage devices for execution by at least one of the one or more processors via the memory, for identifying a variable name corresponding to one of the tags;
   program instructions, stored on at least one of the one or more storage devices for execution by at least one of the one or more processors via the memory, for comparing the variable name with one or more stored variable names, the stored variable names corresponding to previously identified tags; and
   program instructions, stored on at least one of the one or more storage devices for execution by at least one of the one or more processors via the memory, for marking the tag as arrayable based upon the comparing.

6. A computer program product stored in a computer storage media for generating source code, said computer program product comprising:
   one or more computer-readable tangible storage devices;
   program instructions, stored on at least one of the one or more storage devices, for receiving a tag-based input file;
   program instructions, stored on at least one of the one or more storage devices, for identifying one or more tags in the input file that include a field name;
   program instructions, stored on at least one of the one or more storage devices, for creating a variable name for one or more of the field names in the identified tags;
   program instructions, stored on at least one of the one or more storage devices, for generating source code for one or more of the identified tags, the source code including the created variable name;
   wherein the source code is selected from the group consisting of setter source code and getter source code, the setter source code and the getter source code being Java bean source code; and
   wherein the program instructions for generating further comprise:
      program instructions for selecting a source code template; and program instructions for combining the source code template with the variable name.

7. The computer program product as described in claim 6 wherein the field name is the same as the variable name.

8. The computer program product as described in claim 6 further comprising:
- program instructions, stored on at least one of the one or more storage devices, for displaying a screen wherein the displaying includes one or more of the created variable names;
- program instructions, stored on at least one of the one or more storage devices, for receiving a user selection, the selection corresponding to generating the getter source code and the setter source code for one of the created variable names; and
- wherein the program instruction to generate the source code generate the source code for each of the user selected items.

9. The computer program product as described in claim 6 wherein the source code includes a class name and one or more variable declarations, the variable declarations corresponding to one or more of the tags.

10. The computer program product as described in claim 6 wherein the tag-based file is an HTML file and the tags are HTML tags.

11. The computer program product as described in claim 6 further comprising:
- program instructions, stored on at least one of the one or more storage devices, for identifying a variable name corresponding to one of the tags;
- program instructions, stored on at least one of the one or more storage devices, for comparing the variable name with one or more stored variable names; the stored variable names corresponding to previously identified tags; and
- program instructions, stored on at least one of the one or more storage devices, for marking the tag as arrayable based upon the comparing.

* * * * *